Figure 1:
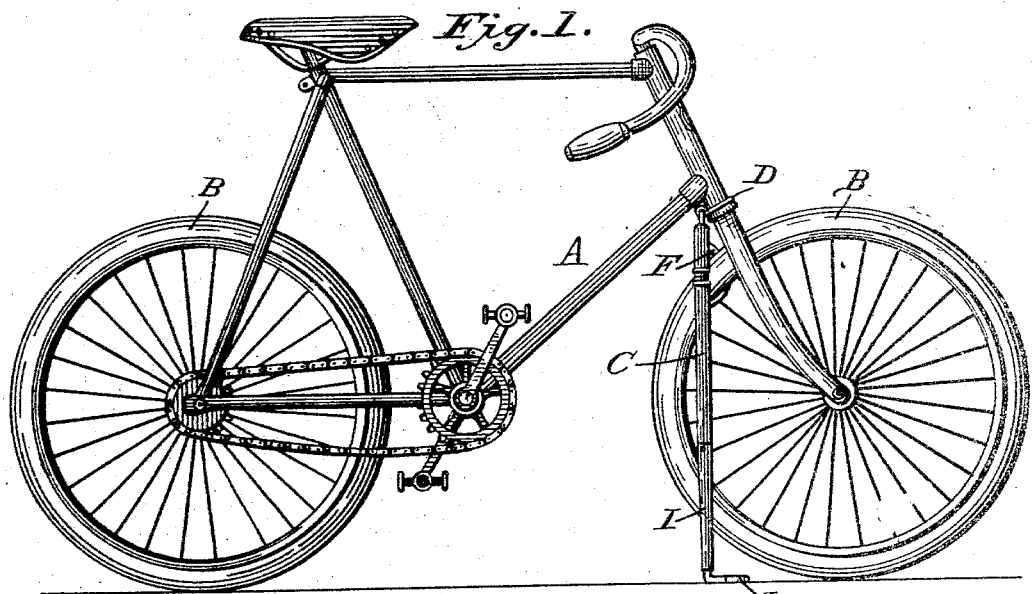

(No Model.)

R. HOLMES.
BICYCLE SUPPORT.

No. 563,927. Patented July 14, 1896.

Witnesses
Edwin G. McKee,
A. E. Hale

Inventor
Robert Holmes
By John Wedderburn
Attorney

UNITED STATES PATENT OFFICE.

ROBERT HOLMES, OF CANYON, COLORADO.

BICYCLE-SUPPORT.

SPECIFICATION forming part of Letters Patent No. 563,927, dated July 14, 1896.

Application filed September 19, 1895. Serial No. 563,035. (No model.)

*To all whom it may concern:*

Be it known that I, ROBERT HOLMES, a citizen of the United States, residing at Canyon city, in the county of Fremont and State of Colorado, have invented certain new and useful Improvements in Bicycle Supports and Locks; and I do hereby declare the following to be a full, clear, and exact description of the invention, such as will enable others skilled in the art to which it appertains to make and use the same.

This invention relates to certain new and useful improvements in bicycle supports and locks designed to be attached to any bicycle and to support the same when at rest, and which will be simple, cheap, and durable. The device is supported from the frame of the machine and so constructed that when unlocked the key cannot be taken out without locking it again. The device is constructed to be folded against the frame, where it will be out of the way, and is easily placed in operative position when desired.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly set forth in the claims.

The invention is clearly illustrated in the accompanying drawings, which, with the letters of reference marked thereon, form a part of this specification, and in which—

Figures 2, 3:
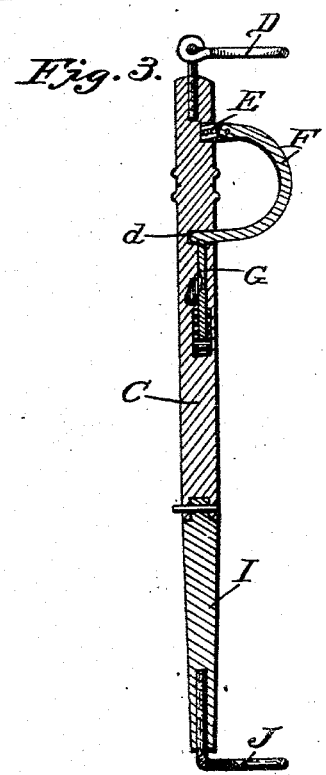
Figure 4:
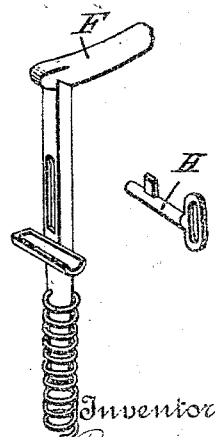

Figure 1 is a side elevation of a bicycle with my improved support and lock applied thereto. Fig. 2 is a perspective view of the attachment before it is applied to the bicycle. Fig. 3 is a substantially central longitudinal section through the same. Fig. 4 is a perspective view of the key and a portion of the hasp.

Like letters of reference indicate like parts throughout the several views.

Referring now to the details of the drawings by letter, A designates the frame of a bicycle of known construction.

B are the wheels.

My improvement embodies the rod C, to the upper end of which is pivotally connected in any suitable manner the clamp-ring D, which is designed to fit over the frame of the bicycle, so as to support the device and prevent its loss and yet allow of the necessary movements of the device, as will be readily understood. From the upper portion of this rod or arm project the ears or lugs E, between which is pivotally held in any suitable manner the hasp F of the lock. The lock is contained within a socket G in the rod or arm, as shown, and the free end of the hasp is designed to be entered in a hole *d* in the side of the socket, as shown. A key H is employed for unlocking and locking the hasp, and the construction of the key and lock is such that when the device is unlocked the key cannot be taken out until the hasp is again locked.

The rod or arm C has an extension I, which may be adjustably held therein or thereto in any suitable manner, and this extension carries a hook J, adapted to be engaged over the frame of the bicycle to hold it up out of the way when riding and to be thrown down to engage the ground to support the bicycle when at rest. It may be adjusted to give the machine more or less inclination from a vertical, as may be required.

The hasp is designed to be engaged over the tire or rim of the wheel when it is desired to lock the same. The bicycle will lean upon and be supported by the arm, and when riding the parts can be held against the frame, where they will be entirely out of the way.

Modifications in detail may be resorted to without departing from the spirit of the invention or sacrificing any of its advantages.

What is claimed as new is—

1. The combination with the rod provided with means for its attachment to a bicycle-frame to support the machine when at rest and the lock therein, of the clamp-ring at one end of the rod, and a hasp pivoted on said rod and adapted to enter said rod to engage the bolt of the lock, substantially as specified.

2. The combination with the rod provided with means for its attachment to a bicycle-frame to support the machine when at rest and the lock therein, of the clamp at one end of said rod, the hook at the opposite end, and a hasp pivoted on said rod, as set forth.

3. The combined bicycle support and lock described, comprising a rod, with a socket having a lock, a clamp-ring pivoted on one end of the rod, an extension on the other end, a hook carried by said extension, and a hasp pivoted on the rod between its ends, substantially as and for the purpose specified.

In testimony whereof I have signed this specification in the presence of two subscribing witnesses.

ROBERT HOLMES.

Witnesses:
 JOHN J. EELES,
 E. P. DOLLIS.